United States Patent [19]

Huignard et al.

[11] 4,403,352
[45] Sep. 6, 1983

[54] SWITCHING DEVICE FOR OPTICAL BEAMS AND TELEPHONE EXCHANGE INCORPORATING SUCH A DEVICE

[75] Inventors: Jean-Pierre Huignard; Pierre Leclerc, both of Paris, France

[73] Assignee: Thomson-CSF, Paris, France

[21] Appl. No.: 326,556

[22] Filed: Dec. 2, 1981

[30] Foreign Application Priority Data

Dec. 5, 1980 [FR] France ................. 80 25910

[51] Int. Cl.³ .................................................. H04Q 3/00
[52] U.S. Cl. ......................................... 455/601; 455/606; 455/612; 455/617; 250/578; 250/551; 370/1; 350/162.11; 350/169
[58] Field of Search ............... 455/600, 601, 606, 607, 455/612, 617; 370/1, 3, 4, 74, 98; 250/551, 578; 350/162.11, 169

[56] References Cited

U.S. PATENT DOCUMENTS 4,074,142   2/1978   Jackson .............................. 250/578
4,229,071   10/1980   d'Ayria et al. ...................... 250/578

FOREIGN PATENT DOCUMENTS 2171241   9/1973   France .
2133709   12/1973   France .
2243573   4/1975   France .

OTHER PUBLICATIONS

*Applied Physics Letters*, vol. 29, No. 9, Nov. 1, 1976, New York (US); J. P. Huignard et al.,: "High sensitivity read-write volume halographic storage in $Bi_{12}SiO_{20}$ and $Bi_{12}GeO_{20}$ crystals", pp. 591/593.

*Primary Examiner*—Robert L. Griffin
*Assistant Examiner*—Edward L. Coles
*Attorney, Agent, or Firm*—Oblon, Fisher, Spivak, McClelland & Maier

[57] ABSTRACT

A Switch is disclosed which makes it possible to optically connect at least one of the circuits of a group of input circuits to at least one circuit of a group of output circuits. A photosensitive medium is illuminated by parallel beams from a matrix of input circuits which beams are then defracted on layers written in the medium and then reach one of the circuits of the matrix of photoreceiver circuits. The layers are written by interference of two beams whose wavelengths differ from that of input beams with the wavelength of the input beams being out of the spectral sensitivity range of the photosensitive medium.

11 Claims, 8 Drawing Figures

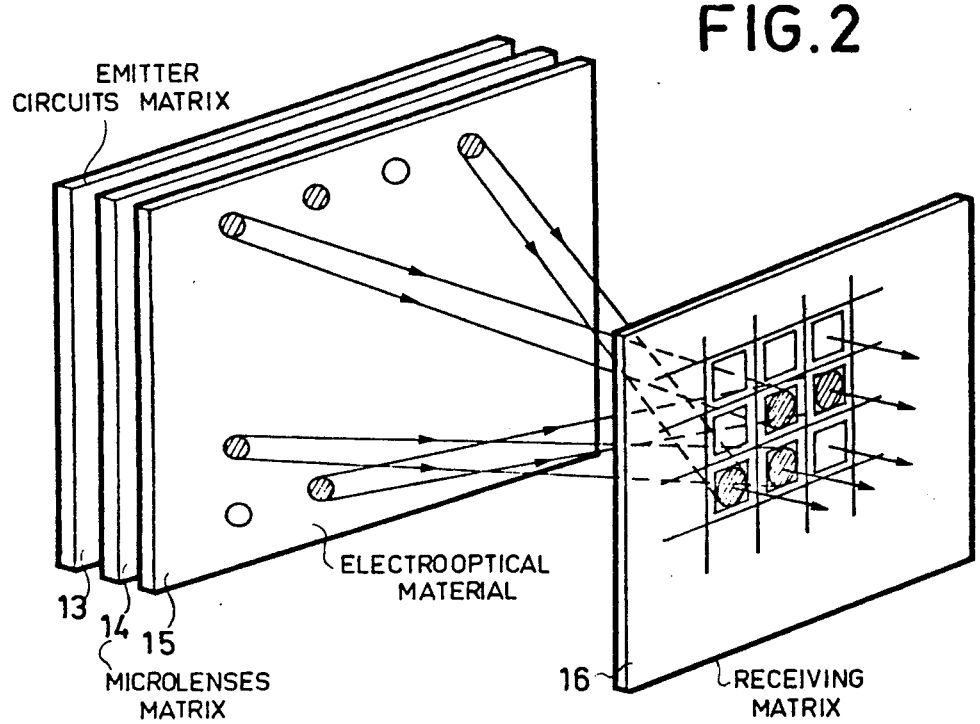
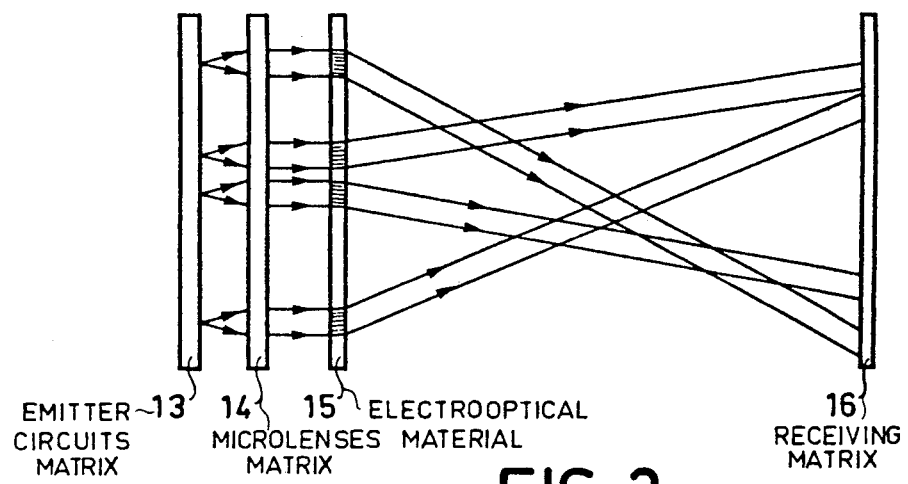

SWITCHING DEVICE FOR OPTICAL BEAMS AND TELEPHONE EXCHANGE INCORPORATING SUCH A DEVICE

BACKGROUND OF THE INVENTION

The present invention relates to electro-optical switching devices making it possible to connect input photoemitter members to output photoreceiver members by optical links, which can be modified under the action of external electric control signals. The use of these signals in telephone switching makes it possible to obtain a telephone exchange in which the association of subscriber lines takes place without movable electric contact.

Numerous electrooptical switching devices have already been produced. It is in particular known to use an input circuit matrix supplying parallel beams and which is optically connected to an output circuit matrix via a matrix of holograms written into a photosensitive medium such as manganese bismuth. The transmission to a circuit of the output matrix takes place during the holographic reading by the incident beam from the corresponding photoemitter circuit. A prior holographic writing has taken place by interference between the incident beam and a second beam. This second beam, due to its orientation obtained by deflection, makes it possible to choose the photoreceiver circuit in the matrix of output circuits.

BRIEF SUMMARY OF THE INVENTION

The present invention relates to a very easily realisable device. Holographic writing and reading are very efficient, little energy is required and the insertion loss in the photosensitive medium is low.

The invention relates to a switching device for optical beams for optically connecting at least one of the circuits of a group of photoemitter circuits to at least one circuit of a group of photoreceiver circuits, comprising means for the deflection of the radiation emitter by the photoemitter circuit rendered parallel beforehand by a collimating means, said deflection means making it possible to direct the radiation onto the active part of the corresponding photoreceiver circuit, the deflection means comprising a diffraction grating written in a photosensitive medium obtained by the interference by two light beams, the said two light beam creating the diffraction grating in the photosensitive medium having a wavelength differing from that of the beams from the photoemitter circuits, the wavelength of the radiation emitted by the photoemitter circuit not being in the spectral sensitivity range of the photosensitive medium, the latter being continuously recyclable and in it the diffraction grating is a space lattice of fringes.

The invention also relates to an automatic telephone exchange using such a switching device.

BRIEF DESCRIPTION OF THE DRAWINGS

The invention is described in greater detail hereinafter relative to non-limitative embodiments and the attached drawings, wherein show:

FIGS. 2 and 3 a partial diagram of the device according to the invention.

DETAILED DESCRIPTION OF THE PREFERRED EMBODIMENTS

Figure 1:
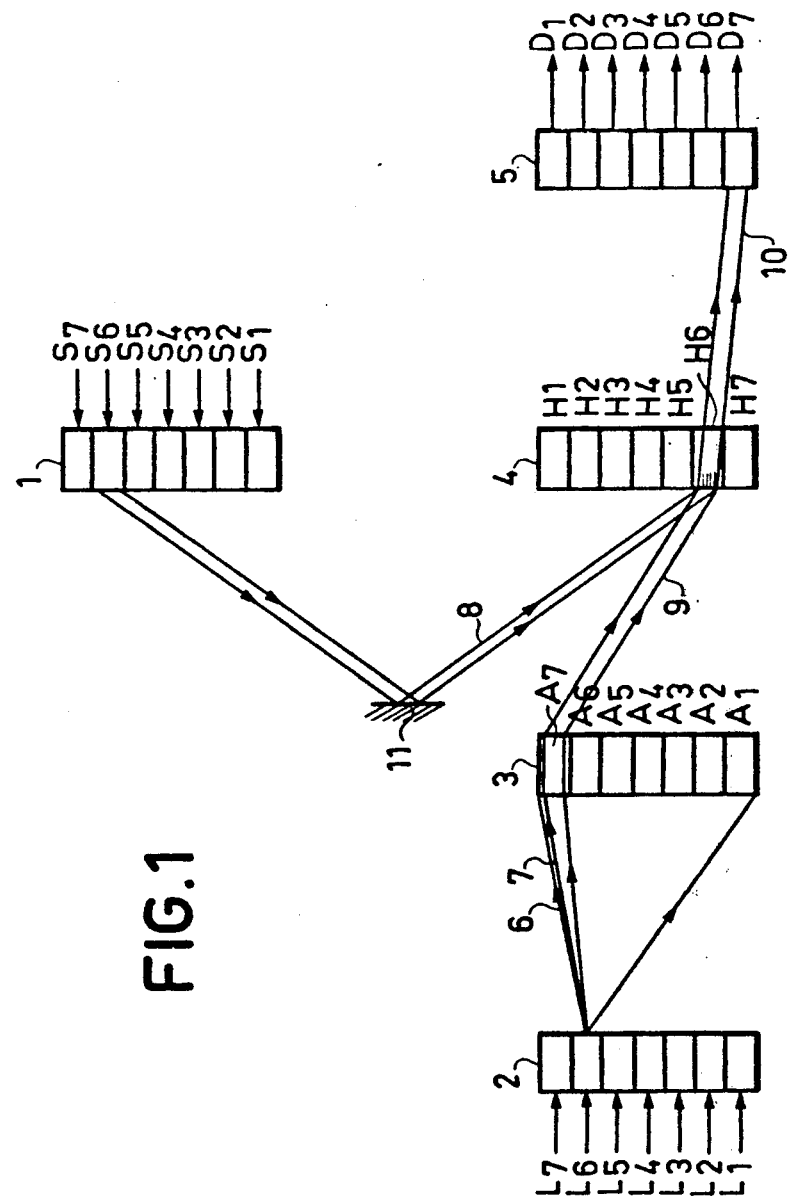
FIG. 1 the state of the art.

FIG. 1 shows a prior art device, the components comprising matrices of optical circuits. The input matrix 1 supplies deflected source beams which are reflected on mirror 11 and thus reach the hologram matrix 4 at a given point. The hologram matrix is obtained by writing in a photosensitive material. For example, in the case of beam 8 from the main source S6, it reaches the photosensitive medium at H6.

In synchronous manner to matrix 1, matrix 2 supplies auxiliary source beams permitting holographic writing after traversing a diaphragm matrix 3. Thus, matrix 2 emits a beam 6 which illuminates the entire surface area of diaphragm matrix 3. In the present case, this beam comes from auxiliary source L6. Only part 9 of this beam emerges from the diaphragm matrix to reach the hologram matrix at 6 and thus interfere with beam 8. Thus, matrices 1 and 2 are illuminated synchronously. In order that the beams reach the same points of the hologram matrix, matrices 2 and 4 are optically conjugated, as are matrices 1 and 4. The diaphragm matrix 3 is conjugated with output matrix 5, so that the choice of diaphragm makes it possible to select the output photoreceiver circuit. Consequently, there is firstly a holographic writing due to incident beams 8 and 9 and secondly the beam 9 is eliminated by closing diaphragm A7. Thus, beam 8 functions as a reference beam and by diffraction an emergent beam is obtained, which reaches the matrix of output circuits on circuit D7 conjugated with the previously selected diaphragm A7. On considering the matrices (lines, columns) matrices 1,2, and 4 are matrices (m, n) and matrices 3 and 5 are matrices (p, q).

However, this system has a number of disadvantages. The useful beam illuminating the diaphragm matrix is reduced to beam 7, so that there is a poor energy efficiency. Moreover, two cycles are required for the operation of the device, namely a holographic writing cycle and a holographic reading cycle.

In FIGS. 2 and 3, various matrices of circuits are considered. The light beams from matrix 13 of the photoemitter circuits are rendered parallel by passing through a microlens matrix 14. These beams are then diffracted on layers written in medium 15 to reach different circuits of the photoreceiver circuit matrix 16. These layers which have previously been written in a thick photosensitive medium are consequently planes parallel to the bisecting plane of surfaces of incident waves which have permitted, by interference, their writing in the said medium. There is also a materialization of a type of "venetian blind", formed by equidistant layers. In the present case, this medium is an electrooptical photosensitive medium, which is continuously recyclable. For example, it can be a high efficiency medium of the bismuth—silicon oxide type (BSO).

The wavelength of the beams from the photoemitter circuits is not in the spectral sensitivity range of the medium and, for example, it is in the infrared range. Thus, the emission matrix 13 is constituted by a grating of m × n modulatable light sources collimated by means of a grating 14 of microlenses or focusing fibres, e.g. of the index gradient type. The thus generated beams face a BSO wafer 15 used as a recording support for the phase gratings of appropriate spacing and orientation being suitable for writing and erasing. At the wavelengths in question, reading of the grating is not destructive, the incident beam being deflected towards the desired address and is read on a matrix of photodetectors. Thus, the optical link between two subscribers is established. The fundamental interest of the device is its possibility of "crossing" in space all the light beams propagating independently between all the points of the input 13 and output 16 matrices.

Figure 4:
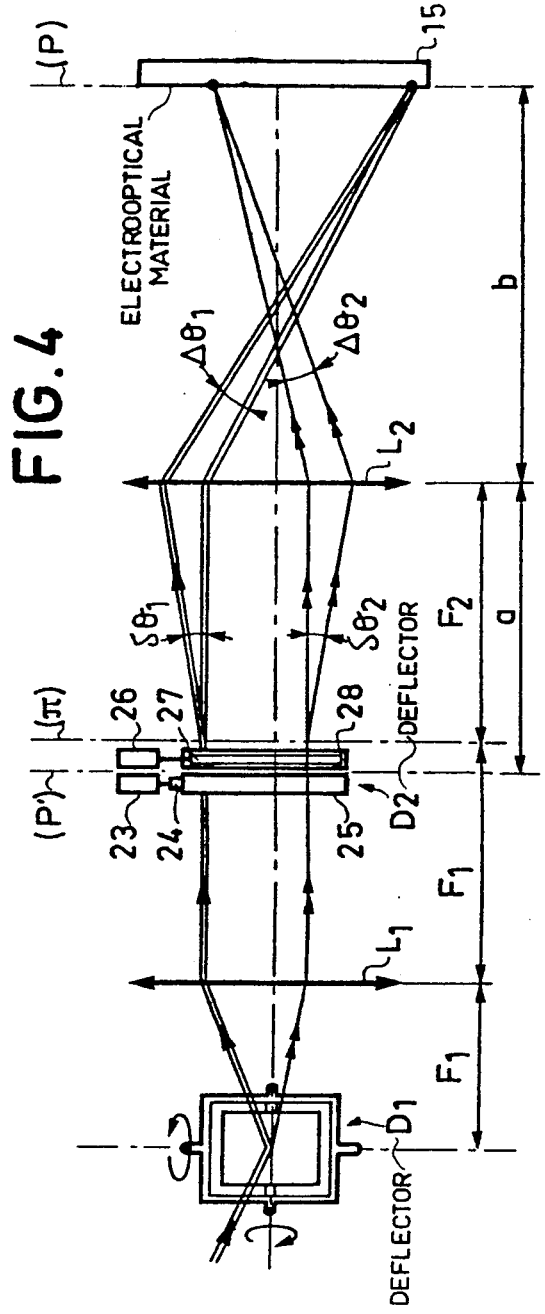
FIG. 4 another partial diagram of the device according to the invention.

The writing of the layers making it possible to ensure switching between two random subscribers is brought about by means of two beams e.g. from an He-Cd laser. Each beam is obtained by means of a device identical to that of FIG. 4. As a thick photosensitive material is used, the change of wavelength between writing and reading makes it necessary to position the recording beams at particular angles. On reading, this ensures the deflection of the beam towards the desired circuit of the output matrix. The device for writing the system of layers is shown in FIG. 4 and comprises a double deflection system XY, whose function is that the first deflector $D_1$ chooses a random point in the switching plane and the second deflector $D_2$ positions the beam with the required incidence on the BSO crystal 15. The beam pivots about a point selected in the plane of the crystal. Deflector $D_2$ is of large size because it must accept the angular field of the first deflector. Lens $L_2$ images the median plane P' of the deflector on plane P of the photosensitive medium, so that $$\frac{1}{a} + \frac{1}{b} = \frac{1}{f2}.$$

As a non-limitative example, deflectors $D_1$ are constituted by galvanometer mirrors functioning on a random access basis in two directions X—Y. Each deflector $D_1$ can be provided with an optical device ensuring the conjugation of deflectors X and Y.

Thus, it is possible to consider as a non-limitative example in the case of deflector $D_1$ a mirror mounted in Cardan manner. The pivot point of this mirror is located at the focus of lens $L_1$, so that a group of beams directed parallel to the optical axis is obtained.

FIG. 4 relates to parallel beams, although this is only true as a first approximation. The distribution of a light beam from a laser is a Gaussian function, but the lenses make it possible to compensate the divergences of the beams.

In the case of deflector $D_2$, it is possible to consider as a non-limitative example, two successive acoustooptical deflectors, one acting in accordance with the vertical axis and the other in accordance with the horizontal axis in a plane perpendicular to the optical axis. The propagation in medium 25 of a sound wave generated by transducer 24, itself subject to the action of a signal from generator 23 leads to a synchronous wave disturbance on the optical index of this medium.

From an optical standpoint, a phase grating whose spacing is equal to $\Lambda = (V/F)$ and whose diffraction pattern makes it possible to control via frequency F the propagation direction of the incident wave interfering therewith corresponds to a frequency travelling wave. Thus, a deflection of the diffracted part of the light beam corresponds to each value of $\Lambda$ and consequently to the frequency applied to the electroacoustic transducer 24.

This first deflection in accordance with the vertical axis is followed by a second deflection in accordance with the horizontal axis. It is obtained by means of the propagation in medium 28 of a sound wave generated by transducer 27, itself subject to the action of a signal from generator 26. The second deflector functions in the same way as the first.

In order to have a strictly defined plane P', it can be considered that these two deflectors are imaged relative to one another by an intermediate imaging system.

Figure 5:
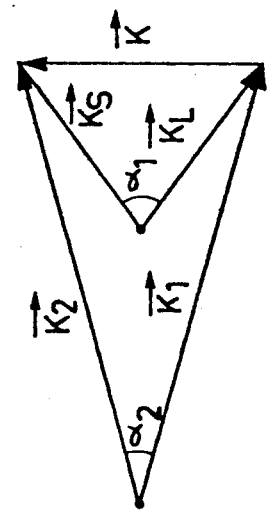
FIG. 5 a special aspect of the device according to the invention.

The fact that plane P' does not completely coincide with plane $\pi$, the focal plane of $L_2$, leads to a slight error, which can be ignored because the deflections $\delta\theta$ are small. In actual fact, medium 15 increases the deflection of the beams, reading and writing taking place at different wavelengths. As a non-limitative example, it is possible to write in visible light and read in infreared. Thus, on writing, wave vectors $\vec{K}_1$ and $\vec{K}_2$ of planar wave fronts which interfere with $\vec{K} = \vec{K}_2 - \vec{K}_1$ correspond to the resultant wave vector K corresponding to the layers created in medium 15. On reading, an output beam deflected so that $\vec{K}_S = \vec{K}_L + \vec{K}$ corresponds to the wave vector $\vec{K}_L$ of the reading beam. Thus, $$|\vec{K}| = \frac{2\pi f}{C},$$

so that the angle $\alpha_1$ is larger than the angle $\alpha_2$ if the frequency of the reading beam is lower than that of the beams which perform the writing operation, $\alpha_1$ and $\alpha_2$ being represented on FIG. 5. Thus, the beam deflected by $D_2$ in accordance with angles $\delta\theta$ converge in plane P in accordance with angles $\Delta\theta$, so that planes P and P' are conjugate. The wave fronts of the converging beams are planar and the layers are parallel.

Therefore, these two systems of deflectors $D_1$ and $D_2$ make it possible to reach the different points of medium 15 according to special orientations.

Figure 6:
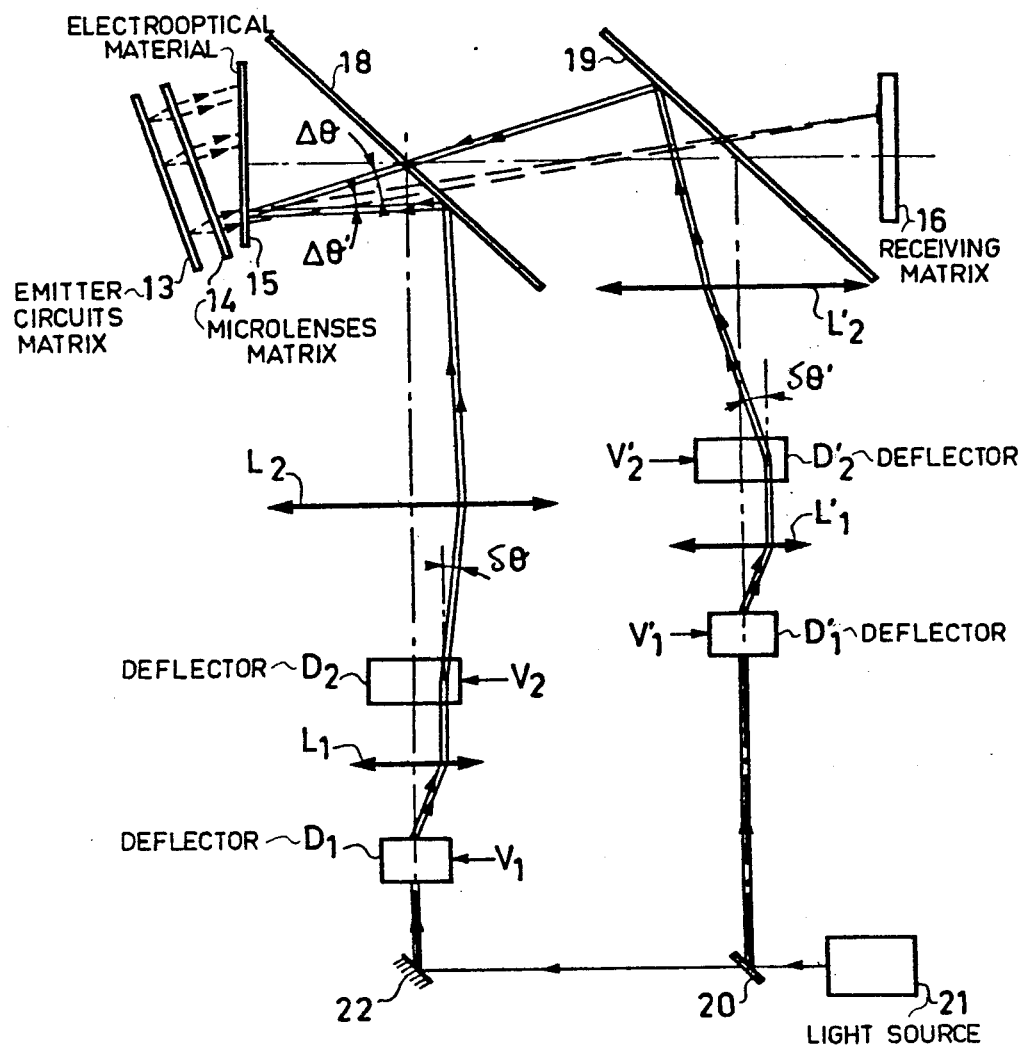
FIG. 6 is a construction of the device according to the invention.

The association of two devices of this type ensures the generation of a system of layers of appropriate spacing and orientation for deflecting the reading beam towards the selected subscriber. These two devices can be arranged in accordance with FIG. 6 for the generation of two beams interfering in the BSO crystals, said interference taking place in a three-dimensional medium. The physical characteristics of this medium and in particular the refractive index are spatially modulated by a system of fringes due to the interference of these two incident beams. Due to the spatial modulation inducing by a gradient a system of layers, any beam from the matrix of photoemitter circuits will be diffracted in a chosen direction. The two writing beams come from the same source 21, which can be e.g. He-Cd laser, after traversing a beam splitter 20.

The addressing voltages $V_1$ and $V'_1$ on the two deflectors $D_1$ and $D'_1$ are equal and make it possible to direct the writing beams onto a given point of the BSO crystal 15. The addressing signals $V_2$ and $V'_2$ on deflectors $D_2$ and $D'_2$ are such that the photoinduced grating is at a Bragg angle to the reading wavelength. The individual control of the angles $\delta\theta$ and $\delta\theta'$ consequently makes it possible to generate a random grating by varying its spacing and the mean orientation of the diffracting layers. Dichroic mirrors make it possible to reflect only the writing beams of known wavelength and to transmit the other beams.

Figure 7:
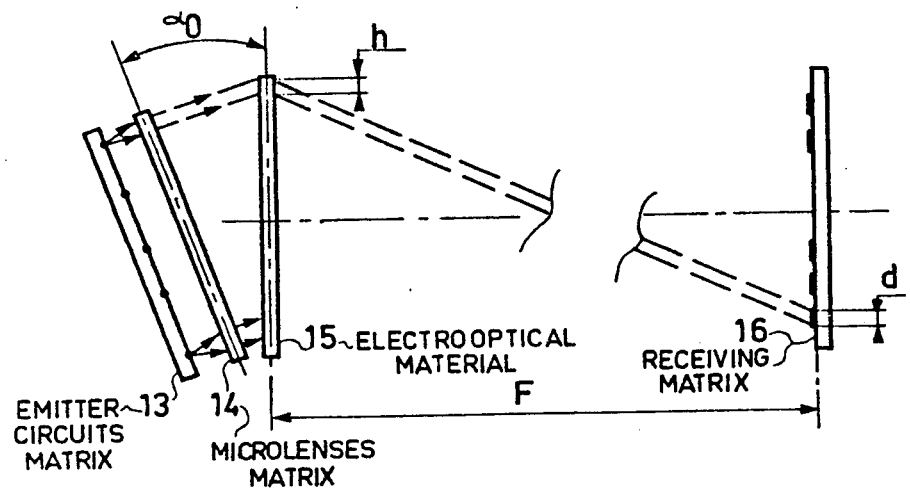
FIGS. 7 and 8 two special aspects of the device according to the invention.
Figure 8:
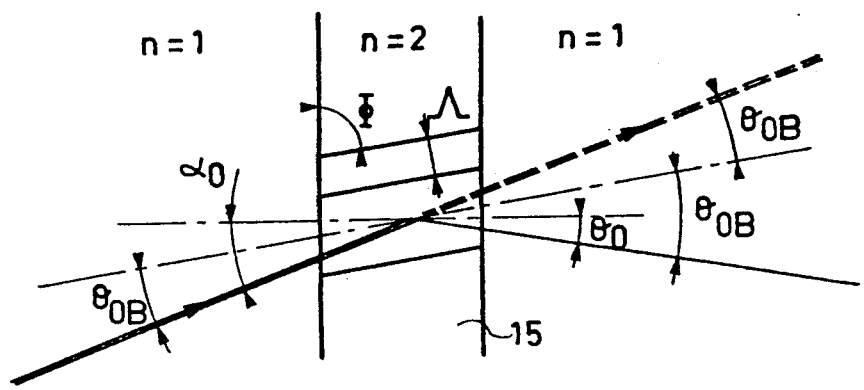

The features of this device will be considered with reference to FIGS. 7 and 8. In FIG. 7, the grating of m×n light sources is collimated by a grating of m×n microlenses. These beams are placed under an oblique incidence angle $\alpha_o$, so that the non-diffracted part of the incident beam is located outside the field of the photoreceiver circuits which can, for example, be photodiodes. The diameter of the diffraction spot must be smaller than the spacing of the matrix of the photoreceiver circuits. If by approximation, consideration is given to the central spot of a diffraction pattern obtained with a point source and a rectangular slot the following formula is obtained:

$$h = \frac{\lambda F}{d},$$

in which $\lambda$ is the wavelength of the beams from the photoemitter circuit matrix, F is the distance separating the plane of the system of layers and the plane of the photoreceiver circuits, d is the width of the diffraction spot in the plane of the photoreceiver circuits and h is the width of the useful layers for the diffraction of incident beams in the photosensitive medium. F being equal to 600 millimeters, d to 1 millimeter, $\lambda$ to 0.9 micrometer so that h is equal to 540 micrometers.

An an example, consideration can be given to a mosaic of 100×100 photodetectors with a spacing of 1.2 mm. By means of FIG. 8, it is possible to calculate the writing conditions of the grating permitting the angular deflection. The grating is under a Bragg angle for the wavelength of the beams from the microlenses. In the medium of index n, the following formulas are obtained:

$$2\theta_B = \alpha + \theta; \sin\theta_B = \frac{1}{2}\frac{\lambda R}{\Lambda}$$

$$\Phi = \frac{\pi}{2} - \alpha + \theta_B$$

In air, the formulas are as follows:

$$\sin\theta_{oB} = \frac{1}{2}\frac{\lambda oR}{\Lambda}$$

and $\lambda oR = n\lambda R$ and for the definition of these angles it is merely necessary to refer to FIG. 8, $\lambda R$ being the reading wavelength in the medium n and $\lambda oR$ in air.

If the same value is retained for the wavelength, $\lambda oR = 0.9$ micrometer, $\theta o = 0.2$ rd, $\alpha 0 = 0.5$ rd, $n = 2$, giving a Bragg angle of the reading wave in air of $\theta_{oB} = 0.35$ rd in the medium of index n $\theta_B = 0.175$ rd, the slope angle of the layer $\Phi = \pi/2 - 1$ and a spacing of the layers of 1.3 micrometers.

With regards to the recording beams at the wavelength $\lambda_{oB} = 0.45$ micrometer there is a Bragg angle of $\theta_{oB} = 0.175$ rd. For example, consideration will be given to an emitter matrix of 100×100 mm, the receiver matrix being 120×100×2 mm.

The writing and erasure time of the grating photoinduced in the crystal is less than 1 millisecond. The diffraction efficiency of the photoinduced grating is $2 \times 10^{-3}$.

Calculations have shown that the writing of all the gratings is possible with commercially available galvanometer mirrors. The size of the mirrors is approximately 60×60 mm. The maximum deflection angle at the output of the acoustooptical deflectors is 25°.

Such devices have a random access time below 10 milliseconds per point. The writing of the photoinduced gratings by creating a space charge field in the BSO material is carried out in zero-field manner by diffusion or by applying a transverse electric field generated e.g. by an interdigitated transducer.

Thus, the present device ensures the spatial switching of $10^4$ subscribers in a time less than 10 milliseconds, no matter which subscriber is considered in the matrix of light sources.

What is claimed is:

1. A switching device for optical beams for optically connecting at least one of the circuits of a group of photoemitter circuits to at least one circuit of a group of photoreceiver circuits, comprising means for the deflection of the radiation emitter by the photoemitter circuit rendered parallel beforehand by a collimating means, said deflection means making it possible to direct the radiation onto the active part of the corresponding photoreceiver circuit, the deflection means comprising a diffraction grating written in a photosensitive medium obtained by the interference by two light beams, the said two light beams creating the diffraction grating in the photosensitive medium having a wavelength differing from that of the beams from the photoemitter circuits, the wavelength of the radiation emitted by the photoemitter circuit not being in the spectral sensitivity range of the photosensitive medium, the latter being continuously recyclable and in it the diffraction grating is a space lattice of fringes.

2. A device according to claim 1, wherein the photoemitter circuits are arranged in matrix manner.

3. A device according to claim 2, wherein the collimating means are lenses arranged in matrix manner, this matrix being positioned in front of the matrix of photoemitter circuits.

4. A device according to claim 3, wherein the lenses are portions of fibres with an index gradient.

5. A device according to claim 1, wherein the light beams permitting the writing of the hologram gratings come from the same beam split by passing through a beam splitter, the thus obtained two beams in each case traversing two deflection systems.

6. A device according to claim 5, wherein the first deflection system comprises a cardan-mounted mirror.

7. A device according to claim 5, wherein the second deflection system comprises two acoustooptical deflectors acting in two directions perpendicular to the plane perpendicular to the optical axis.

8. A device according to claim 1, wherein the photoemitter circuits are optical fibres.

9. A device according to claim 1, wherein the photoreceiver circuits are optical fibres.

10. A device according to claim 1, wherein the photosensitive medium is a monocrystalline layer of bismuth-silicon oxide.

11. A device according to claim 1 comprising the same number of photoemitter circuits and photoreceiver circuits.

* * * * *